(12) United States Patent
Eck et al.

(10) Patent No.: US 6,810,908 B2
(45) Date of Patent: Nov. 2, 2004

(54) FUEL TANK FOR A MOTOR VEHICLE

(75) Inventors: Karl Eck, Frankfurt (DE); Wolfgang Sinz, Sulzbach (DE)

(73) Assignee: Siemens Aktiengesellschaft, Munich (DE)

( * ) Notice: Subject to any disclaimer, the term of this patent is extended or adjusted under 35 U.S.C. 154(b) by 241 days.

(21) Appl. No.: 10/195,414

(22) Filed: Jul. 16, 2002

(65) Prior Publication Data

US 2003/0024577 A1 Feb. 6, 2003

(30) Foreign Application Priority Data

Jul. 17, 2001 (DE) .......................................... 101 33 967

(51) Int. Cl.[7] .............................................. F02M 37/04
(52) U.S. Cl. ............................ 137/565.22; 137/565.34; 123/509; 123/514
(58) Field of Search ....................... 137/565.22, 565.34; 123/509, 514

(56) References Cited

U.S. PATENT DOCUMENTS

| | | | | | |
|---|---|---|---|---|---|
| 1,857,004 | A | * | 5/1932 | Rebillet ................. | 137/565.22 |
| 4,860,714 | A | * | 8/1989 | Bucci ........................ | 137/263 |
| 5,078,169 | A | | 1/1992 | Scheuenbrand et al. .... | 137/574 |
| 5,396,872 | A | * | 3/1995 | Ruger et al. ................. | 123/514 |
| 6,098,600 | A | | 8/2000 | Umetsu et al. ............. | 123/514 |
| 6,123,511 | A | * | 9/2000 | Sertier ......................... | 123/509 |
| 6,230,691 | B1 | * | 5/2001 | Coha et al. ............ | 137/565.22 |
| 6,276,342 | B1 | * | 8/2001 | Sinz et al. .................. | 123/514 |
| 6,283,142 | B1 | * | 9/2001 | Wheeler et al. ....... | 137/565.22 |
| 6,371,153 | B1 | * | 4/2002 | Fischerkeller et al. . | 137/565.22 |

FOREIGN PATENT DOCUMENTS

| | | |
|---|---|---|
| DE | 197 50 036 C1 | 9/1999 |
| DE | 198 33 696 C2 | 2/2000 |
| DE | 198 27 944 A1 | 3/2000 |
| DE | 298 24 208 U1 | 8/2000 |
| DE | 199 12 642 A1 | 10/2000 |
| DE | 199 14 062 A1 | 10/2000 |

OTHER PUBLICATIONS

Copy of German Search Report dated Apr. 29, 2000, Munich, DE.

* cited by examiner

Primary Examiner—John Rivell
(74) Attorney, Agent, or Firm—Morrison & Foerster LLP

(57) ABSTRACT

In a fuel tank for a motor vehicle, an intermediate tank is arranged for the intermediate storage of fuel fed via a plurality of suction jet pumps. The intermediate tank distributes the fuel to a plurality of baffles having feed units. One of the feed units is thereby prevented from running dry in the event of transverse accelerations of the fuel tank.

14 Claims, 2 Drawing Sheets

FUEL TANK FOR A MOTOR VEHICLE

CLAIM FOR PRIORITY

This application claims the benefit of priority of German Patent Application 101 33 967.1 filed Jul. 17, 2001.

TECHNICAL FIELD OF THE INVENTION

The invention relates to a fuel tank for a motor vehicle, and in particular, to a motor vehicle with a feed unit provided for sucking in fuel from a baffle, and with a suction jet pump for feeding fuel into the baffle.

BACKGROUND OF THE INVENTION

Fuel tanks are often used in present-day motor vehicles and are known from practice. In this context, the suction jet pump serves, as a rule, for feeding fuel out of a chamber remote from the baffle. This ensures that the baffle is consistently filled with fuel when the fuel tank is virtually empty. Emptying of the baffle may lead to the feed unit running dry and consequently to its destruction.

One disadvantage, however, is that present-day fuel tanks often have a very shallow and wide configuration. The baffle is therefore very low. Hence, when the motor vehicle is cornering, there is a the risk that fuel will flow out of the chamber having the suction jet pump and the feeding of the suction jet pump will cease. The baffle may consequently be emptied quickly.

SUMMARY OF THE INVENTION

The problem on which the invention is based is to design a fuel tank of the type initially mentioned, such that the feed unit is reliably prevented from running dry.

In one embodiment of the invention, an intermediate tank is arranged between the suction jet pump and the baffle, the intermediate tank configured for the intermediate storage of the fuel fed by the suction jet pump and for conducting the fuel into the baffle.

In one aspect of the invention, the intermediate tank is first filled with fuel. This fuel subsequently flows into the baffle. Consequently, even in the case of very small baffles, the constant filling of these with fuel can be ensured. The feed unit can be reliably prevented from running dry by virtue of the invention.

Often, in motor vehicles with high-powered internal combustion engines, a plurality of feed units are used in a corresponding number of baffles. Peak consumption of the internal combustion engine are thereby covered. The feed units each supply a suction jet pump arranged in remote regions of the fuel tank. In the conventional fuel tank, each of the suction jet pumps serves for filling one of the baffles. However, this configuration leads to one of the feed units running dry when the associated suction jet pump is no longer covered with fuel. It is conceivable for each of the suction jet pumps to be connected to an intermediate tank. However, according to an advantageous embodiment of the invention, a contribution to a further increase in the reliability of the supply of fuel to the feed units is made when a plurality of baffles and suction jet pumps are connected in each case to a common intermediate tank. In this configuration, virtually any desired number of suction jet pumps can be arranged, distributed, in various chambers of the fuel tank according to the invention. The additional tank is constantly filled with fuel when at least one of the suction jet pumps is covered by fuel. The connection of the intermediate tank to the baffles in which feed units are arranged ensures that the feed units are constantly supplied with fuel. Consequently, an emergence of a suction jet pump or of a few suction jet pumps does not lead to an interruption in the filling of the intermediate tank and therefore of the baffles.

According to another advantageous embodiment of the invention, a constant filling of the baffles can be ensured in a simple way when the intermediate tank is arranged above the baffles.

The intermediate tank could, for example, be open upwardly, so that it can overflow. However, according to another advantageous embodiment of the invention, an unnecessary circulation of fuel fed via the suction jet pumps can be avoided in by a device for generating an intended dynamic pressure in the intermediate tank as a function of the filling level of the latter. The power of the suction jet pump is thereby regulated by the dynamic pressure, so that, with the intermediate tank filled, its further filling can be avoided. The circulation consequently avoided leads to a particularly low permeation of the fuel tank according to the invention.

According to another advantageous embodiment of the invention, the device for generating an intended dynamic pressure is configured in structural terms when the intermediate tank is closed and when an overflow of the intermediate tank has a throttle. The throttle may be of virtually any desired configuration and at an intended pressure automatically switch the overflow or be open solely when there is air in the upper region of the intermediate tank and close upon contact with fuel. Moreover, the intermediate tank can therefore be vented via the throttle.

According to another advantageous embodiment of the invention, a completely wear-free control of the power of the suction jet pump or of the suction jet pumps can be produced in when a delivery line for the fuel fed by the suction jet pump or the suction jet pumps is arranged in the lower region of the intermediate tank. The dynamic pressure thereby rises in proportion to the filling level in the intermediate tank.

In the case of transverse accelerations of the fuel tank according to the invention, a filling of the baffles is ensured when discharge lines leading to the baffles are arranged in the lower region of the intermediate tank. In the case of particularly sharply angled fuel tanks according to the invention and the intermediate tanks having a dynamic pressure, a routing of the fuel out of the intermediate tank into the baffles can be ensured, even counter to transverse acceleration forces, when throttles and/or non-return valves are arranged in the discharge lines leading to the baffles.

According to another advantageous embodiment of the invention, the baffles are filled with fuel, even when the intermediate tank is virtually empty, when the lower region of the intermediate tank has a funnel-shaped configuration. A quantity of fuel sufficient for the baffles is constantly collected in the bottom region of the intermediate tank at the discharge lines to the baffles when an angle α of the funnel-shaped region of the wall to the cross section of the intermediate tank is equal to the arc tangent of the transverse acceleration to the gravitational acceleration.

The fuel tank according to the invention has a configuration in structural terms when the overflow of the intermediate tank has a tube passing through the funnel-shaped region of the wall and when the tube is connected to at least one of the baffles.

According to another advantageous embodiment of the invention, a contribution to a further reduction in the circulation of the fuel is made when a return line of an internal combustion engine of the motor vehicle is led into the intermediate tank.

In one aspect of the invention, device generating an intended dynamic pressure in the baffle or the baffles contribute to a further reduction in the circulation of the fuel and therefore to a reduction in the permeation of fuel through the wall of the fuel tank according to the invention.

In another aspect of the invention, the number of lines to be laid within the fuel tank can be kept particularly low when a plurality of feed units have a common distributor for lines leading to the suction jet pumps and a forward-flow line leading to the internal combustion engine.

BRIEF DESCRIPTION OF THE DRAWINGS

The invention permits numerous embodiments. Various embodiments are illustrated in the drawings and are described below. In the drawings.

DETAILED DESCRIPTION OF THE PREFERRED EMBODIMENTS

Figure 1:
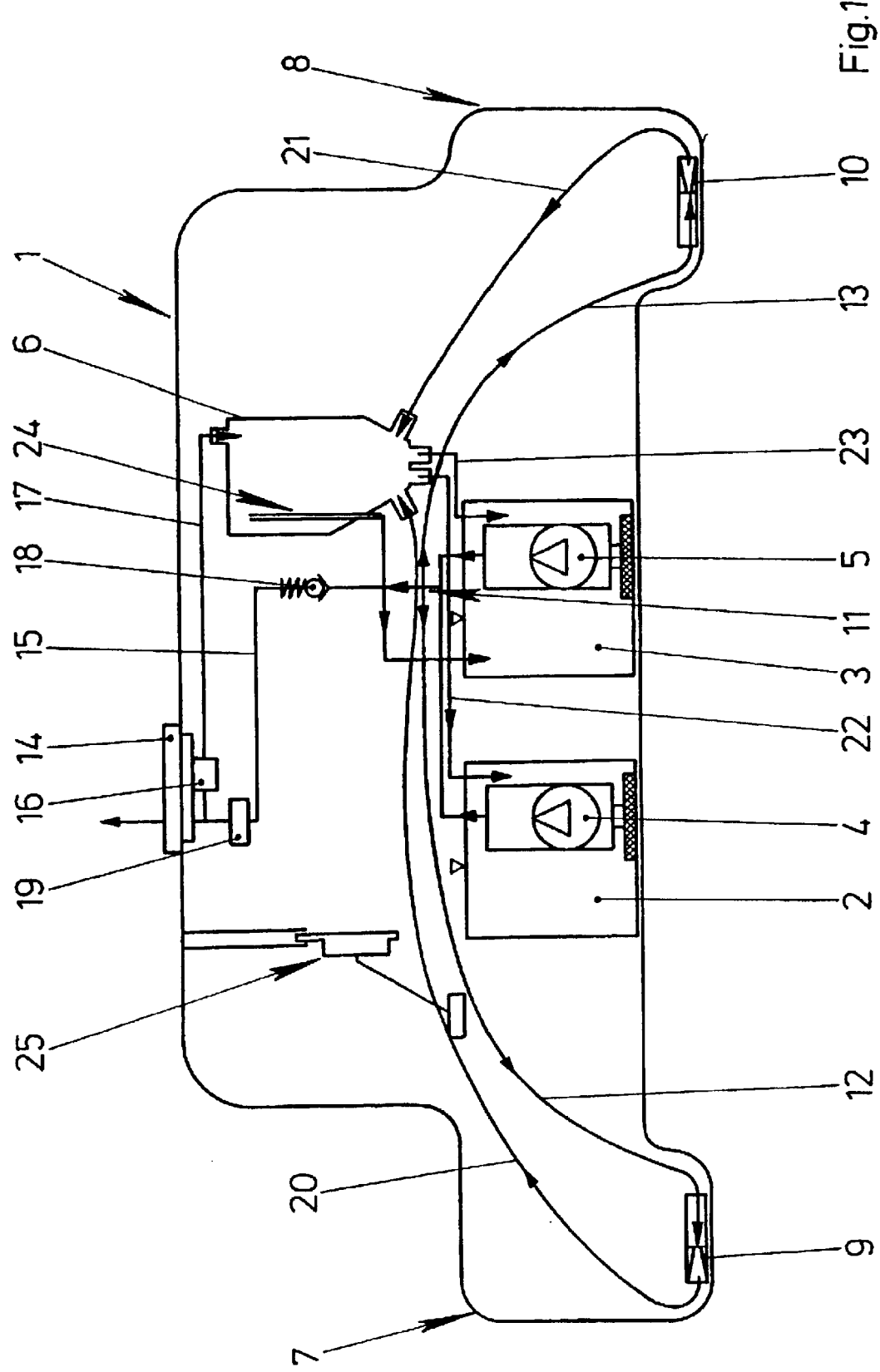
FIG. 1 shows a sectional illustration through a fuel tank according to the invention.

FIG. 1 shows a sectional illustration through a fuel tank 1 for a motor vehicle, with two feed units 4, 5 arranged in each case in a baffle 2, 3. An intermediate tank 6 is arranged above the baffles 2, 3. The fuel tank 1 has, in its outer regions, a chamber 7, 8 with suction jet pumps 9, 10 arranged in it. The feed units 4, 5 feed fuel out of the baffles 2, 3 to a common distributor 11. Connected to the distributor 11 are lines 12, 13 leading to the suction jet pumps 9, 10 and a forward-flow line 15 led through a flange 14 to an internal combustion engine, not illustrated, of the motor vehicle. The flange 14 of the fuel tank 1 holds a pressure regulator 16. The pressure regulator 16 opens above an intended pressure in the forward-flow line 15 and guides fuel via a return line 17 into the intermediate tank 6. Furthermore, a non-return valve 18 and a fuel filter 19 are arranged in the forward-flow line 15. The intermediate tank 6 is filled with fuel via delivery lines 20, 21 connected to the suction jet pumps 9, 10. Discharge lines 22, 23 lead from the intermediate tank 6 to the baffles 2, 3. For the sake of clarity, the flows of the fuel are designated by arrows in the drawing. Moreover, the intermediate tank 6 has an overflow 24 connected to one of the baffles 3. Furthermore, FIG. 1 shows that a supply transmitter 25 is arranged within the fuel tank 1.

Figure 2:
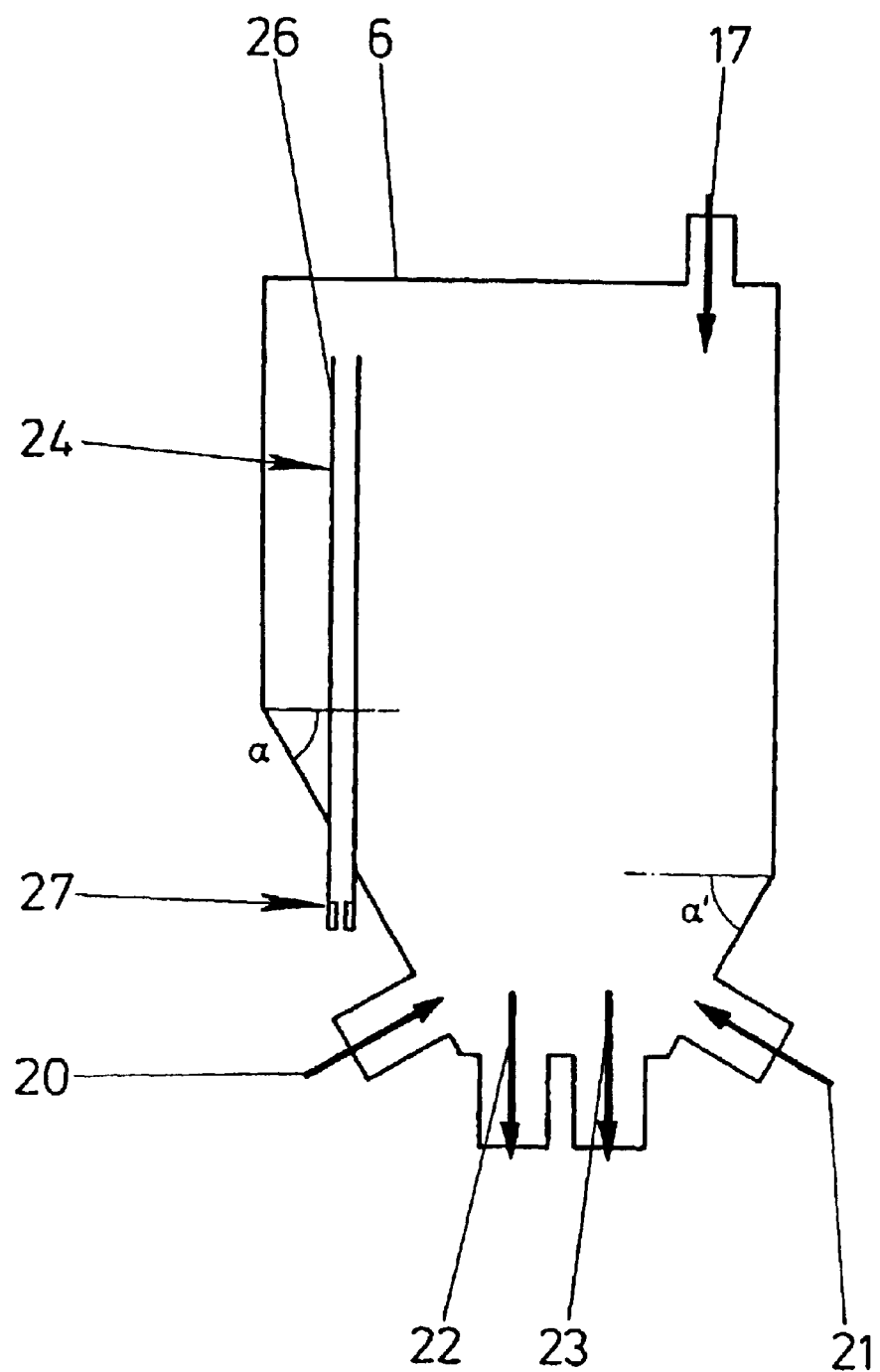
FIG. 2 shows an enlarged sectional illustration of an intermediate tank of the fuel tank of FIG. 1.

FIG. 2 shows the intermediate tank 6 of FIG. 1 in an enlarged sectional illustration. It can be seen, here, that the overflow 24 of the intermediate tank 6 has a tube 26. The tube 26 passes through a funnel-shaped bottom region of the intermediate tank 6 and has a throttle 27. An angle α of the funnel-shaped region of the wall to the cross section of the intermediate tank 6 amounts, for example, to 60° for transverse accelerations of 1.7 g.

What is claimed is:

1. A fuel tank for a motor vehicle, comprising:
   a feed unit provided for acquiring fuel from a baffle;
   a suction jet pump for feeding fuel into the baffle; and
   an intermediate tank arranged between the suction jet pump and the baffle, the intermediate tank configured for the intermediate storage of the fuel fed by the suction jet pump and for conducting the fuel into the baffle.

2. The fuel tank as claimed in claim 1, wherein a plurality of baffles and suction jet pumps are connected to a common intermediate tank.

3. The fuel tank as claimed in claim 1, wherein the intermediate tank is arranged above the baffles.

4. The fuel tank as claimed in claim 1, further comprising a device for generating an intended dynamic pressure in the intermediate tank as a function of the filling level of the tank.

5. The fuel tank as claimed in claim 1, wherein the intermediate tank is closed, and an overflow of the intermediate tank has a throttle.

6. The fuel tank as claimed in claim 1, further comprising a delivery line for the fuel fed by the suction jet pump or the suction jet pumps arranged in a lower region of the intermediate tank.

7. The fuel tank as claimed in claim 2, further comprising discharge lines leading to the baffles are arranged in the lower region of the intermediate tank.

8. The fuel tank as claimed in claim 6, wherein the lower region of the intermediate tank has a funnel-shaped configuration.

9. The fuel tank as claimed in claim 8, wherein an angle α of the funnel-shaped region of the wall to a cross section of the intermediate tank is equal to the arc tangent of transverse acceleration to gravitational acceleration.

10. The fuel tank as claimed in claim 5, wherein the overflow of the intermediate tank has a tube passing through the funnel-shaped region of the wall, and the tube is connected to at least one of the baffles.

11. The fuel tank as claimed in claim 1, further comprising a return line of an internal combustion engine of the motor vehicle is led into the intermediate tank.

12. The fuel tank as claimed in claim 1 further comprising a device for generating an intended dynamic pressure in the baffle.

13. The fuel tank as claimed in claim 1, further comprising a plurality of feed units having a common distributor for lines leading to the suction jet pumps and a forward-flow line leading to the internal combustion engine.

14. The fuel tank as claimed in claim 2, wherein the intermediate tank is arranged above the baffles.

* * * * *